March 4, 1947.　　　L. SCHOTT　　　2,416,850
ROCKING HORSE
Filed Feb. 2, 1946　　　3 Sheets-Sheet 1
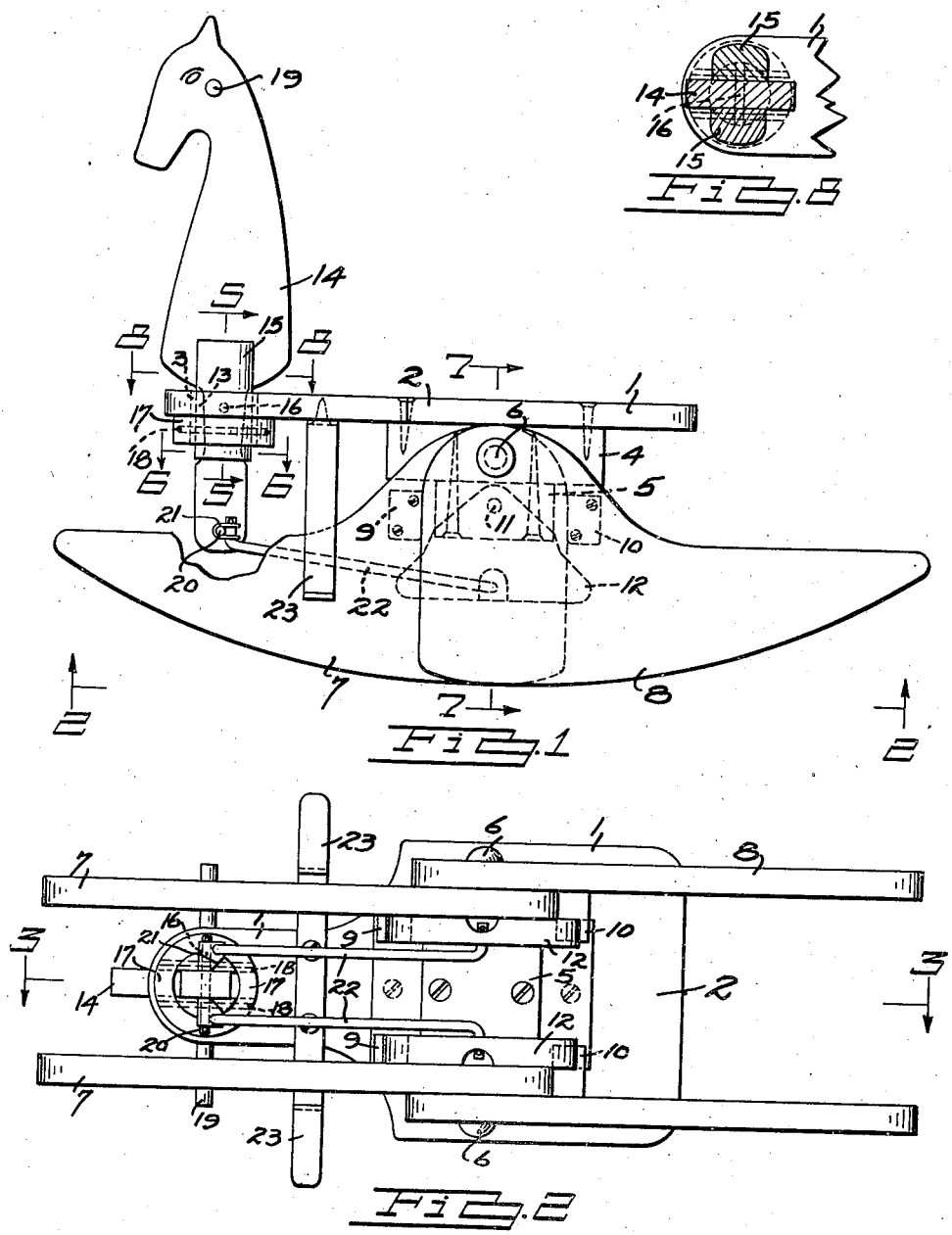
INVENTOR
Lawrence Schott
BY
ATTORNEY March 4, 1947.  L. SCHOTT  2,416,850
ROCKING HORSE
Filed Feb. 2, 1946  3 Sheets-Sheet 2

INVENTOR
Lawrence Schott
BY
ATTORNEY

March 4, 1947.  L. SCHOTT  2,416,850
ROCKING HORSE
Filed Feb. 2, 1946  3 Sheets-Sheet 3
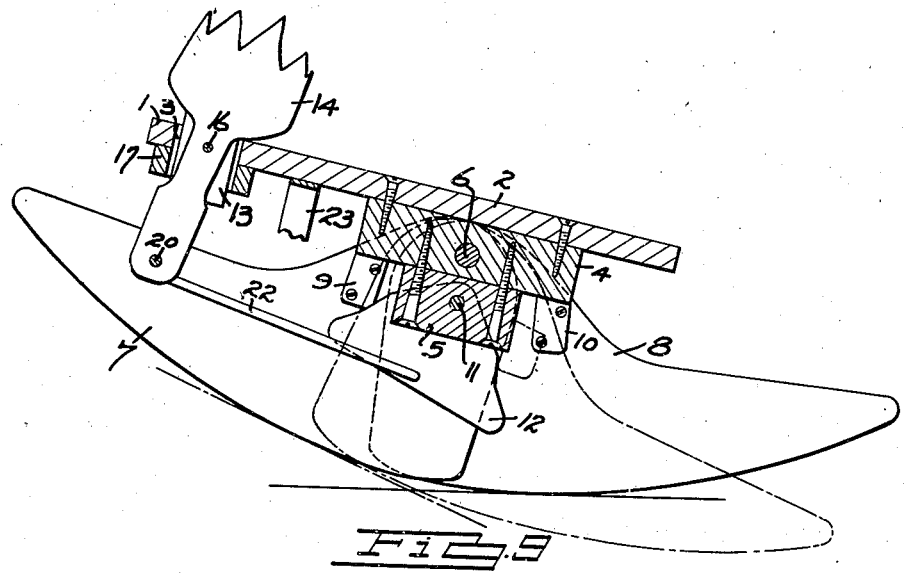
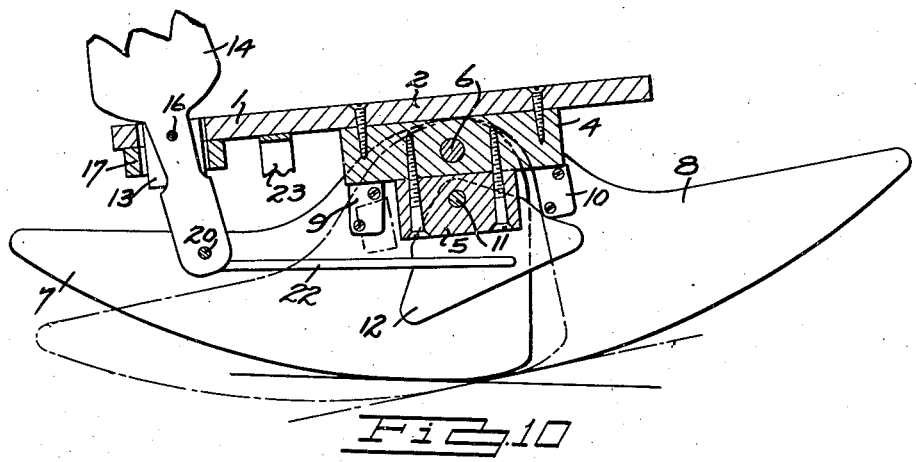
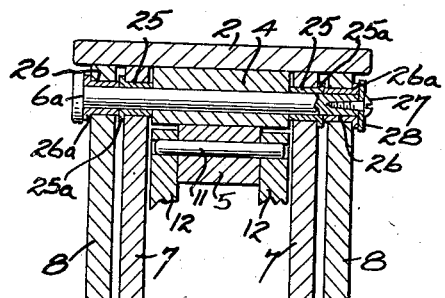
INVENTOR
Lawrence Schott
BY
Gerald F. Baldwin
ATTORNEY Patented Mar. 4, 1947

2,416,850

UNITED STATES PATENT OFFICE 2,416,850

ROCKING HORSE

Lawrence Schott, Detroit, Mich.

Application February 2, 1946, Serial No. 645,029

20 Claims. (Cl. 272—53)

This invention relates to improvements in rocking horses. It is an object of the invention to provide a rocking horse including simple control means which may be so set that the horse either remains in the same place when rocked or travels along a desired path.

Another object of the invention is to provide a rocking horse having a control means thereon by adjustment of which the horse, when rocked, will travel forward or backward, and along either a straight or a curved course according to the setting of the said means.

A further object of the invention is to provide a rocking horse including a control means by the setting of which the distance which the horse travels along a selected path each time it is rocked may be regulated.

Another object of the invention is to provide a rocking horse wherein the control means is actuated by movement of a handle projecting from the horse's head.

Yet another object of the invention is to provide a rocking horse including two front and two rear rockers, all of which are preferably mounted for pivotal movement about a common axis, and selective means for restricting or preventing the independent movement of one rocker on each side against independent movement about its pivot axis as the horse is rocked to cause it to travel along the desired course.

Another object of the invention is to provide a rocking horse including a head pivoted for movement about both a horizontal and a vertical axis and to provide control means for reducing or preventing pivotal movement of either the front or the rear rockers when the head is moved in one direction or the other about its horizontal axis so that during each rocking movement the horse travels a lesser or greater distance along a straight path; for reducing or preventing pivotal movement of the front rocker on one side and the rear rocker on the other when the head is turned in one direction or the other about its vertical axis so that then the horse turns a lesser or greater extent during each rocking movement; and for proportionately reducing or preventing pivotal movement of the front rocker on one side and the rear rocker on the other when the head is turned from its mid, or neutral, position, about both its horizontal and vertical axes so that then, upon each rocking movement, the horse travels either forward or backward along a curved path to the right or left. In the latter case whether the horse travels forward or backward depends upon the direction in which the head is moved about its horizontal axis, and the direction in which the horse turns depends upon the direction in which the head is turned about its vertical axis.

Another object of the invention is to provide a rocking horse which is relatively cheap and simple to manufacture, and wherein the control means is so arranged that it can be easily manipulated by a small child who quickly learns how to travel in the desired direction.

Having thus stated some of the objects and advantages of the invention I will now describe a preferred embodiment thereof with the aid of the accompanying drawings, in which:

Figure 1 is a front elevation of the invention showing the control means in neutral position.

Figure 2 is an inverted plan on the line 2—2 of Figure 1.

Figure 3:
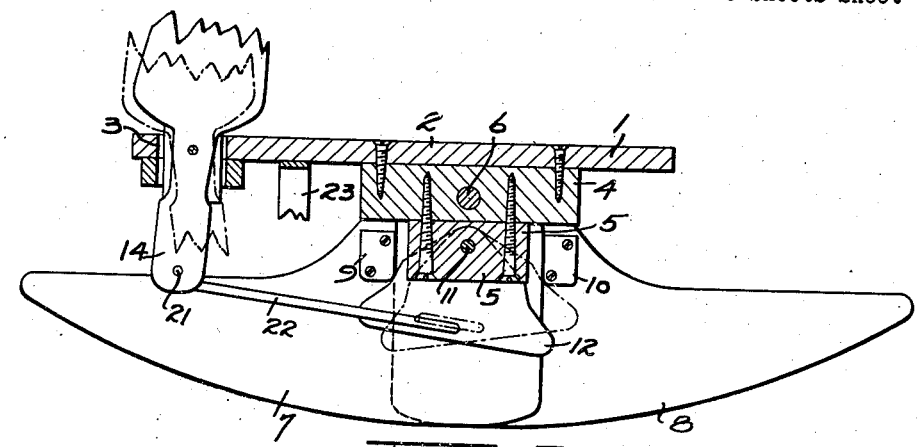
Figure 3 is a section on the line 3—3 of Figure 2.
Figure 4:
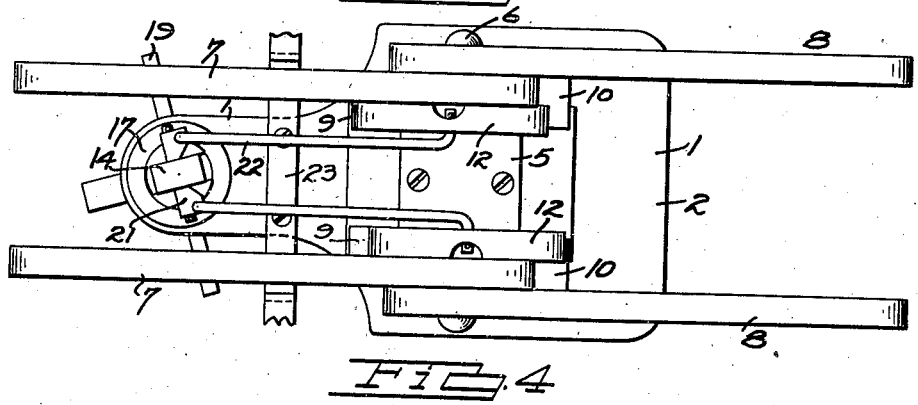
Figure 4 is an inverted plan similar to that shown in Figure 2 but with the head turned about its vertical axis for preventing pivotal movement of the front rocker on one side and the rear rocker on the other side so that the horse turns when rocked.
Figure 5:
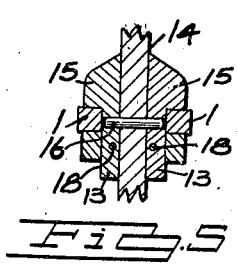
Figure 6:
Figure 7:
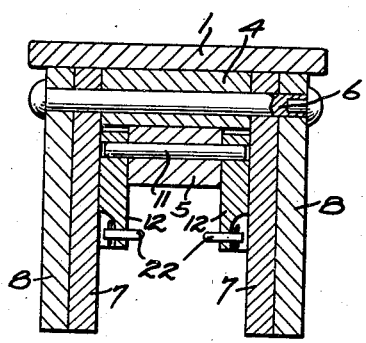

Figures 5, 6, 7 and 8 are sections on the lines 5—5, 6—6, 7—7 and 8—8 respectively of Figure 1.

Figure 9 is a partial longitudinal section with the head turned in one direction about its horizontal axis showing the front rocker held against independent pivotal movement and the rear rocker free to swing a limited distance about its pivot axis.

Figure 10 is another partial longitudinal section with the head turned in the other direction about its horizontal axis showing the rear rocker held against independent pivotal movement and the front rocker free to swing a limited distance about its pivot axis.

Figure 11 shows a slight modification of the means for mounting the rockers on their pivot axis.

Referring to the drawings, 1 designates a frame having a seat 2 thereon and a vertical opening 3 therethrough adjacent its front extremity. Also forming part of the frame 1 and secured transversely beneath the seat 2 is a main bearing block 4 and projecting downwardly from and integral with the latter is a control bearing block 5.

Extending horizontally and transversely through the main bearing block 4 and projecting beyond both ends thereof is a main axle 6, and pivotally mounted on each extremity of the latter and beneath the seat 2 is a front rocker 7 and a rear rocker 8. Secured to the inner faces of the front and rear rockers 7 and 8 are opposed stops 9 and 10 respectively. These stops 9 and 10 are so positioned that they contact the main bearing block 4 to limit the outward swing of their respective rockers, and the stops 10 are positioned to engage the rear faces of the front rockers 7 and limit the inward swing of each front rocker relative to the adjacent rear rocker, or vice versa.

Passing horizontally through the control bearing block 5, usually in vertical alignment with the main axle 6, is a pin 11 on each extremity of which a control element 12 is pivoted. By movement of the control elements, in a manner hereinafter described, each may be positioned to engage one stop 9 or 10 and restrict or prevent pivotal movement of the rocker on which it is mounted, as shown in Figures 9 and 10 wherein the stops 9 and 10 respectively are engaged between the main bearing block 4 and one control element 12.

Mounted for rotation about a vertical axis in the opening 3 are two opposed, spaced bushing portions 13 between which a head member 14 extends, and 15 denotes an outward projection on the upper side of each bushing portion to prevent its downward movement through the opening 3. Extending horizontally through both bushing portions 13 and through the head member 14 within the opening 3 and transversely of the frame is a hinge pin 16. It will be noted that that portion of the head member which extends between the bushing portions is narrower than the said portions to permit limited pivotal movement of the said member. A collar 17, mounted around the lower extremities of the bushing portion 13 and through which the head member projects, rests against the underside of the frame 1 and is held in place by cotter pins 18 each of which extends longitudinally through the said collar and through one of the said bushing portions.

A handle 19 is supported intermediately of its length in the upper portion of the head member 14, and projects sufficiently on both sides thereof; and extending similarly through and from the opposite sides of the said member beneath the frame is a pin 20. Suitably secured on each extremity of the latter, as by a clip 21, is the front extremity of a rod 22 the opposite end of which is secured to one of the control elements 12 to impart movement thereto about its pivot axis. 23 denotes foot supports suitably mounted on the frame 1.

It will be noted that the rockers 7 and 8 are rounded toward their inner overlapping extremities and that the radial distance from the axis 6 to their respective undersides is greater vertically beneath the said axis than to their inner overlapping extremities, so that when the weight of the horse is transferred to one pair of rockers the other pair is raised off the ground and therefore either or both of the rockers of the other pair may swing pivotally toward the first pair.

From the foregoing it will be seen that the member 14 may be turned about the vertical axis of the opening 3 with the bushing portions 13, or about the horizontal axis of the pin 16, or about both these axes.

If the head member 14 is vertical and not turned either to the right or left, that is in mid or neutral position shown in Figures 1 and 2, the control elements 12 do not in any way restrict the pivotal movement of the rockers. Then if the horse is rocked it remains in the same place and does not travel along the ground because the inward swing of the pair of rockers first off the ground is offset by the inward swing of the other pair of rockers when they are off the ground.

If the head member 14 is turned about the horizontal axis of the pin 16 by pulling the handles 19 toward the seat both control elements 12 are moved into the position shown in Figure 9 so that pivotal movement of the front rockers 7 is prevented and pivotal action of the rear rockers 8 only is permitted. Consequently each time the horse rocks and the weight is transferred to the front rockers 7 the rear rockers 8 swing forward and the horse consequently moves forward. Again if the head member 14 is pulled only slightly back, sufficient for the control members 12 to restrict but not entirely prevent pivotal movement of the front rockers 7 then when rocked the horse still advances but more slowly because the greater pivotal movement of the rear rockers is in part offset by the lesser pivotal movement of the front rockers.

Similarly by pushing the handles 19 away from the seat 2, as shown in Figure 10, and thus turning the member 14 in the opposite direction about the pin 16 the control elements 12 move to restrict or prevent pivotal motion of the rear rockers 10 so that the horse travels backwards.

If the horse's head is turned to the right or left, that is if the head member 14 and the bushing portions 13 are turned about the axis of the opening 3, one rod 22 is pulled forward and the other is pushed back so that the control elements 12 pivot in opposite directions to restrict or prevent pivotal movement of one front rocker 7 and the rear rocker 8 on the opposite side. If at that time the head member is in neutral position so far as the horizontal axis 16 is concerned, then when rocked, the horse gradually turns in the direction toward which the head is turned but does not travel either backward or forward. However if at that time the head member is also turned about the pin 16 then the permitted pivotal movements of the rockers 7 and 8 are relatively so proportioned that the horse turns while travelling either forward or backward.

In the modification shown in Figure 11 each adjacent pair of rockers 7 and 8 is spaced from one another to insure free swinging of each rocker independently about its axis. In the arrangement shown an inner bushing 25 is provided through each front rocker 7 and an outer bushing 26 extends through each rear rocker 8. All the bushings 25 and 26 have external flanges 25a and 26a on their outer extremities. The inner extremities of the bushings 25 bear against the main bearing block 4 and the inner extremities of the bushings 26 bear against the outer faces of the flanges 25a. One extremity of the axle 6a is provided with a head to bear against one flange 26a and the opposite extremity of the axle receives a screw 27 by which a washer 28 is retained in contact with the outer face of the other flange 26a. Thus the two rockers of each pair are firmly held in spaced relation to one another.

While in the foregoing the preferred embodiment of the invention has been described and shown it is understood that alterations and modifications may be made thereto provided the said alterations and modifications fall within the scope of the appended claims.

What I claim is:

1. A rocking horse including a frame having a seat thereon, a member mounted on the frame for movement about a horizontal axis, a front and a rear rocker pivoted on each side of the frame, and control means actuated by movement of said member in one direction or the other for restricting pivotal movement of both front or both rear rockers respectively.

2. A rocking horse including a frame having a seat thereon, a member mounted on the frame for rotary movement about a vertical axis, a front and a rear rocker pivoted on each side of the frame, and control means actuated by movement of said member in either direction for restricting pivotal movement of the front rocker on one side of the frame and the rear rocker on the other.

3. A rocking horse including a frame having a seat thereon, a member mounted on the frame for movement about an axis, a front and a rear rocker pivoted on each side of the frame, all the rockers being pivoted about a common axis, and control means actuated by movement of said member for restricting pivotal movement of one rocker on each side of the frame.

4. A rocking horse including a frame having a seat thereon, a member mounted on the frame for turning movement both about a horizontal axis and a substantially vertical axis, a front and a rear rocker pivoted on each side of the frame, and control means actuated by movement of said member about both axes for proportionately restricting independent pivotal movement of a plurality of the rockers.

5. A rocking horse including a frame having a seat thereon, a front and a rear rocker pivoted on each side of the frame, and selective means for restricting independent pivotal movement of one rocker on each side of the frame.

6. A rocking horse including a frame having a seat thereon, a front and a rear rocker pivoted on each side of the frame, all the rockers being pivoted about a common axis, and selective control means for restricting independent pivotal movement of one rocker on each side of the frame.

7. A rocking horse including a frame having a seat thereon, overlapping front and rear rockers pivoted on each side of the frame, means for limiting the pivotal movement of all the rockers in both directions, and selective control means for further restricting the pivotal movement of one rocker on each side of the frame.

8. The combination set forth in claim 7, wherein each adjacent pair of rockers is transversely spaced from one another.

9. The combination set forth in claim 7, wherein all the rockers are pivoted about a common axis.

10. A rocking horse including a frame having a seat thereon, a front and a rear rocker pivoted on each side of the frame, means for limiting the pivotal movement of each rocker in both directions, and selective control means for further restricting the pivotal movement of one rocker on each side of the frame.

11. A rocking horse including a frame having a seat thereon, a front and a rear rocker pivoted on each side of the frame, a stop on each rocker, a control element mounted for movement on the frame adjacent each side thereof to selectively engage the stop on one rocker on that side and restrict its pivotal movement in one direction, and means for actuating both control means.

12. A rocking horse including a frame having a seat thereon, a front and a rear rocker pivoted on each side of the frame, a stop on each rocker, means on the frame for contacting the stops and limiting the pivotal movement in one direction of all the rockers, and selective control means for restricting the pivotal movement of either rocker on each side of the frame in the other direction.

13. A rocking horse including a frame having a seat thereon, a front and a rear rocker pivoted on each side of the frame, a stop on each rocker, a control element pivoted on each side of the frame to selectively restrict or prevent movement of either rocker on that side by contact with the stop thereon, means for moving both control means, and means on the frame for contacting the stops and limiting the movement of the latter away from the control elements.

14. The combination set forth in claim 13, wherein one rocker on each side is adapted to contact the stop on the other rocker on that side to limit the swinging movement of the rockers in one direction.

15. A rocking horse including a frame having a seat thereon, a front and a rear rocker pivoted on each side of the frame, a stop on each rocker, a control element pivoted on each side of the frame to selectively restrict pivotal movement of one of the rockers on that side by engagement with the stop thereon, and a member mounted for movement about a horizontal axis connected to both control elements by the degree of movement of which the amount of restriction of the pivotal movement of either both front or both rear rockers may be controller.

16. A rocking horse including a frame having a seat thereon, a front and a rear rocker pivoted on each side of the frame, a stop on each rocker, a control element pivoted on each side of the frame to selectively restrict pivotal movement of one rocker on that side by engaging the stop thereon, a member rotatable about a substantially vertical axis by the degree of movement of which the amount of restriction of the pivotal movement of one rocker on each side of the frame is regulated, and means connecting the member with both control elements.

17. A rocking horse comprising a frame including a seat and a main bearing, a front rocker and a rear rocker on each side of the frame, means carried by the main bearing for supporting all the rockers for movement about a common axis, a downward extension on said main bearing, a stop on each rocker to contact the block and limit the movement of said rocker in one direction, selective control means pivoted on opposite sides of said downward extension for engaging the stop on one rocker on each side of the frame to limit the pivotal movement of those two rockers, and means for actuating the control means.

18. A rocking horse including a frame having a seat thereon, split bushing portions rotatably mounted about a vertical axis in the frame and extending therethrough, a member extending substantially vertically between the bushing portions for rotation with the latter, front and rear rockers pivoted on each side of the frame, stops projecting from the rockers, a control element mounted for movement on each side of the frame to contact either stop on that side, a pin projecting on both sides from the member beneath the frame, and means connecting each end of the pin with one of the control elements whereby both the latter are moved by rotation of the member.

19. The combination set forth in claim 18, wherein the member is also pivotally supported about a horizontal axis extending between the bushing portions whereby both control members are also moved by movement of the member about a horizontal axis.

20. A rocking horse comprising a frame having a seat thereon, said frame having a vertical opening therethrough, two split bushing portions extending through the opening, a member mounted between the bushing portions for rotation therewith about a vertical axis, a horizontal pin extending through said member and both bushing portions, operating handles projecting from the member above the frame, a pin projecting from both sides of the member below the frame, overlapping front and rear rockers pivoted on each side of the frame, all the rockers being pivoted about a common axis, an inwardly projecting stop on each rocker, a control element pivoted on each side of the frame to engage either stop on that side and limit the pivotal movement in one direction of the rocker from which that stop projects, said stops being also adapted to contact portions of the frame to limit the pivotal movement of each rocker in the opposite direction, a rod connecting each end of the pin extending through the member below the frame with one of the control elements, and the overlapping ends of the front and rear rockers being so formed that as the weight passes onto one pair the other pair of rockers is raised off the ground.

LAWRENCE SCHOTT.